US012612185B2

(12) United States Patent
Attwell et al.

(10) Patent No.: US 12,612,185 B2
(45) Date of Patent: Apr. 28, 2026

(54) SEAL POSITIONING TOOL

(71) Applicant: Airbus Operations Limited, Filton (GB)

(72) Inventors: Jack Attwell, Filton (GB); Allan Powell, Filton (GB)

(73) Assignee: AIRBUS OPERATIONS LIMITED, Filton (GB)

( * ) Notice: Subject to any disclaimer, the term of this patent is extended or adjusted under 35 U.S.C. 154(b) by 0 days.

(21) Appl. No.: 18/940,351

(22) Filed: Nov. 7, 2024

(65) Prior Publication Data

US 2025/0153863 A1 May 15, 2025

(30) Foreign Application Priority Data

Nov. 15, 2023 (GB) ...................................... 2317528

(51) Int. Cl.
B64F 5/10 (2017.01)
B23P 19/04 (2006.01)

(52) U.S. Cl.
CPC .............. B64F 5/10 (2017.01); B23P 19/047 (2013.01)

(58) Field of Classification Search
CPC .. B64F 5/10; B64F 5/00; B23P 19/047; B23P 19/04; B23P 19/00
See application file for complete search history.

(56) References Cited

U.S. PATENT DOCUMENTS

| | | | | |
|---|---|---|---|---|
| 11,511,888 | B2 * | 11/2022 | Edwards | ................. B64C 3/187 |
| 11,572,950 | B2 * | 2/2023 | Peacock | ................... B64C 3/18 |
| 12,110,107 | B2 * | 10/2024 | Humphrys | .............. B64C 3/187 |
| 2019/0135455 | A1 * | 5/2019 | Edwards | ................... B64F 5/50 |
| 2020/0278026 | A1 * | 9/2020 | Peacock | ................... B64C 7/00 |
| 2022/0258849 | A1 * | 8/2022 | Humphrys | ................ B64C 3/18 |

FOREIGN PATENT DOCUMENTS

GB          2581816 A          9/2020

OTHER PUBLICATIONS

United Kingdom Search Report for corresponding United Kingdom Patent Application No. 2317528.4 dated Apr. 30, 2024.

* cited by examiner

*Primary Examiner* — Lawrence Averick

(74) *Attorney, Agent, or Firm* — Greer, Burns & Crain, Ltd.

(57) ABSTRACT

A tool and method for positioning a sealing member in an aircraft wing assembly by using first and second holes in a first component of the aircraft wing assembly and first and second holes in a second component of the aircraft wing assembly as positioning reference points, wherein a positional relationship of the first and second holes in the first component matches a positional relationship of the first and second holes in the second component.

15 Claims, 8 Drawing Sheets

30

30

60

34

32

2

210

212

204

206

214

220

222

226

230

228

232

224

229

231

100

102 — Providing a device

104 — Arranging on first component

106 — Adjusting position

108 — Securing pins in position

110 — Securing position referencing features

112 — Removing from first component

114 — Placing on position setting part

116 — Arranging on second component

118 — Setting sealing member

120 — Securing sealing member

SEAL POSITIONING TOOL

CROSS-REFERENCES TO RELATED APPLICATIONS

This application claims the benefit of Great Britain Patent Application Number 2317528.4 filed on Nov. 15, 2023, the entire disclosure of which is incorporated herein by way of reference.

FIELD OF THE INVENTION

The present invention relates to a tool and method for positioning a sealing member in an aircraft wing assembly.

BACKGROUND OF THE INVENTION

It may be necessary to apply seals to various components of an aircraft wing assembly. However, this may be time consuming and difficult, especially after the components have been fitted together. It may therefore by desirable to reduce the time taken to apply the seals and make this easier.

SUMMARY OF THE INVENTION

According to a first aspect, there is disclosed a tool for positioning a sealing member in an aircraft wing assembly by using first and second holes in a first component of the aircraft wing assembly and first and second holes in a second component of the aircraft wing assembly as positioning reference points, wherein a positional relationship of the first hole and the second hole with respect to each other in the first component matches a positional relationship of the first hole and the second hole with respect to each other in the second component, the tool comprising: a position referencing part comprising: a first body for receiving a first position referencing pin and receiving a second position referencing pin; and one or more position referencing features, wherein at least one of the first and second position referencing pins when received in the first body is moveable relative to the first body so that the first body is arrangeable on the first component of the aircraft wing assembly with the first position referencing pin received in the first hole of the first component and with the second position referencing pin received in the second hole of the first component with the first position referencing pin and the second position referencing pin having a first reference positional relationship with respect to each other and the one or more position referencing features of the position referencing part positioned with respect to one or more corresponding referencing features of a further component of the aircraft wing so that the one or more position referencing features of the position referencing part have a second reference positional relationship with respect to the first position referencing pin and the second position referencing pin; a position setting part comprising: a second body for receiving a first position setting pin and a second position setting pin; wherein the second body is arrangeable on the second component of the aircraft wing assembly with the first position setting pin received in the first hole of the second component and the second position setting pin received in the second hole of the second component with the first and second position setting pins have a positional relationship with respect to each other that matches the first reference positional relationship, wherein the position setting part further comprises a position setting member for setting a position of the sealing member when the second body is so arranged on the second component of the aircraft wing assembly, wherein the position setting member is arrangeable so that the position setting member has a positional relationship relative to the first position and second holes of the second component, dependent upon the second reference positional relationship, to a position for setting the position of the sealing member.

The tool may help to align the sealing member on the second component of the aircraft wing assembly such that, when the first component of the aircraft wing assembly is secured to the second component of the aircraft wing assembly, a substantially fluid tight seal is created. The tool may allow the sealing member to be applied before the first component is secured to the second component, which may reduce the need to access an interior of the aircraft wing assembly during assembly to apply a seal. This may help to speed up assembly and may also reduce the likelihood of damage occurring as a result of tools and/or workers having to access the interior of the aircraft wing assembly.

The second body may comprise a first bush and a second bush, and the second body may be placeable on the first body and at least one of the first bush and the second bush is moveable relative to the second body such when second body is placed on the first body when the first position referencing pin and the second position referencing pin are fixed in the first reference positional relationship, the first position referencing pin is received in the first bush and the second position referencing pin is received in the second bush with the first and second bushes having a positional relationship that matches the first positional relationship, wherein the first bush and second bush are lockable in the positional relationship that matches the first positional relationship.

The second body may be removable from the first body with the first bush and second bush locked in the positional relationship that matches the first positional relationship and the first position setting pin may be insertable in the first bush and the second position setting pin is insertable in the second bush with the first bush and second bush locked in the positional relationship that matches the first positional relationship. This may allow the first and second position setting pins to have the same positional relationship relative to each other and the first and second position referencing pins.

The position setting member may be a retainer configured to hold the sealing member and, when the second body is positioned on the second component of the aircraft wing assembly with the first position setting pin received in the first hole of the second component and the second position setting pin received in the second hole of the second component, the retainer may have a positional relationship relative to the first position setting pin and the position setting pin that corresponds with the second reference positional relationship, whereby the retainer may be positioned to set the position of the sealing member. The retainer may hold the sealing member in the correct position relative to the second component such that when the first component of the aircraft wing assembly is secured to the second component of the aircraft wing assembly, a substantially fluid tight seal is created.

The retainer may comprise a plate that is substantially perpendicular to the second body. The plate may comprise a recess configured to receive the sealing member and hold the sealing member in place relative to the second body. The recess may restrict movement of the sealing member relative to the plate such that the retainer can hold the sealing member in position.

The one or more position referencing features of the position referencing part may comprise at least one protrusion extending from a surface of the first body. The plurality of protrusions may engage with the one or more features of the first component to provide improved alignment between the first portion and the one or more features of the first component.

Both the first position referencing pin and the second position referencing pin may be moveable relative to the first body. This may allow for greater adjustment than if only a single pin is moveable. Moreover, this may help to account for manufacturing tolerances in the first portion, the second portion, the first component and/or the second component.

At least one of the position referencing part and the position setting part may comprise a substantially "L-shaped" cross-sectional shape.

The first component of the aircraft wing assembly may comprise a rib of the aircraft wing assembly and the second component of the aircraft wing assembly may comprise at least one of a stringer and a lower cover of the aircraft wing assembly. The further component of the aircraft wing may comprise an outer housing configured to receive the sealing member and the one or more corresponding referencing features comprise one or more parts of the outer housing.

The position referencing part and the position setting part may be a single position referencing and setting part, the first body and the second body may be a single body, the first position referencing pin and the first position setting pin may be a single first position referencing and setting pin and the second position referencing pin and the second position setting pin may be a single second position referencing and setting pin, the tool may further comprise: a leg extending from, and movable, relative to the body, wherein the leg may be the position setting member and comprise the one or more positioning referencing features, wherein: when the body is positioned on the first component of the aircraft wing assembly with the first pin received in the first hole of the first component and with the second pin received in the second hole of the first component so that the first pin and the second pin have the first reference positional relationship with respect to each other, the leg may be configurable, relative to the body, to position the one or more position referencing features against one or more corresponding referencing features of the further component of the aircraft wing such that the one or more positioning referencing features are in the second reference positional relationship with respect to the first and second pins; and wherein, when the body is positioned on the second component of the aircraft wing assembly with the first pin received in the first hole of the second component and the second pin received in the second hole of the second component so that the first pin and the second pin have the first reference positional relationship with respect to each other, the position setting member may be configurable so that the one or more positioning referencing features have the second reference positional relationship with respect to the first and second pins, whereby the position setting member is positioned to set the position of the sealing member.

The leg may be moveable relative to the first body when the first body is in a fixed position relative to the first component. This may allow the leg to be moved to the desired position relative to the first component while the first body is fixed in position.

One of the first and second position referencing pins may be fixed in position relative to the first body. This may help to keep a spacing between the pins constant.

A distance between the first position referencing pin and the second position referencing pin may be between approximately (i.e., +/−10%) 50 mm and 100 mm. A distance between the first position setting pin and the second position setting pin may be between approximately 50 mm and 100 mm. This may allow the tool to be used in a variety of locations in the aircraft wing assembly.

According to a second aspect, there is provided a method of positioning a sealing member in an aircraft wing assembly by using first and second holes in a first component of the aircraft wing assembly and first and second holes in a second component of the aircraft wing assembly as positioning reference points, wherein a positional relationship of the first and second holes in the first component matches a positional relationship of the first and second holes in the second component, the method comprising: providing the tool according to the first aspect; arranging the position referencing part on the first component of the aircraft wing assembly such that the first position referencing pin is received by the first hole in the first component and the second position referencing pin is received in the second hole of the first component with the first position referencing pin and the second position referencing pin having a first position relationship with respect to each other; positioning the one or more position referencing features of the position referencing part with respect to one or more corresponding referencing features of the further component of the aircraft wing so that the one or more position referencing features of the position referencing part have a second reference positional relationship with respect to the first position referencing pin and the second position referencing pin; removing the position referencing part from the first component; arranging the position setting part on the second component such that the first position setting pin is received by the first hole in the second component and the second position setting pin is received by the second hole in the second component with the first and second position setting pins having a position relationship with respect to each other that matches the first reference positional relationship; and using the position setting member, that has a positional relationship relative to the first position setting pin and the second position setting pin that corresponds with the second reference positional relationship, to set the position of the sealing member.

The method may help to align the sealing member on the second component of the aircraft wing assembly such that, when the first component of the aircraft wing assembly is secured to the second component of the aircraft wing assembly, a substantially fluid tight seal is created. The method may allow the sealing member to be applied before the first component is secured to the second component, which may reduce the need to access an interior of the aircraft wing assembly during assembly to apply a seal. This may help to speed up assembly and may also reduce the likelihood of damage occurring as a result of tools and/or workers having to access the interior of the aircraft wing assembly.

The method may comprise securing the first and second position referencing pins in position relative to the first body before removing the position referencing part from the first component. This may help to ensure that the first and second position referencing pins remain in the same position relative to the first body when the position referencing part is removed from the first component.

The method may comprise, before arranging the position setting part on the second component, placing the position referencing part on the position setting part such that a first bush of the second body receives the first position referencing pin and a second bush of the second body receives the second position referencing pin and the position setting member of the position setting part has a positional relationship relative to the first position setting pin and the second position setting pin that corresponds with the second reference positional relationship. This may allow the position setting member to be located in the correct position relative to the first and second positions setting pins such that the seal member will be set in the correct position by the position setting member.

The method may comprise securing the one or more position referencing features relative to the first body before removing the position referencing part from the first component. This may help to ensure that the relative position between the first body and the one or more position referencing features remains the same when the position referencing part is removed from the first component.

The method may comprise securing the sealing member to the second component after placing the second portion on the second component. The securing the sealing member may comprise applying an adhesive between the sealing member and the second component. This may ensure that the sealing member remains secured to the second component when the position setting part is removed from the second component.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
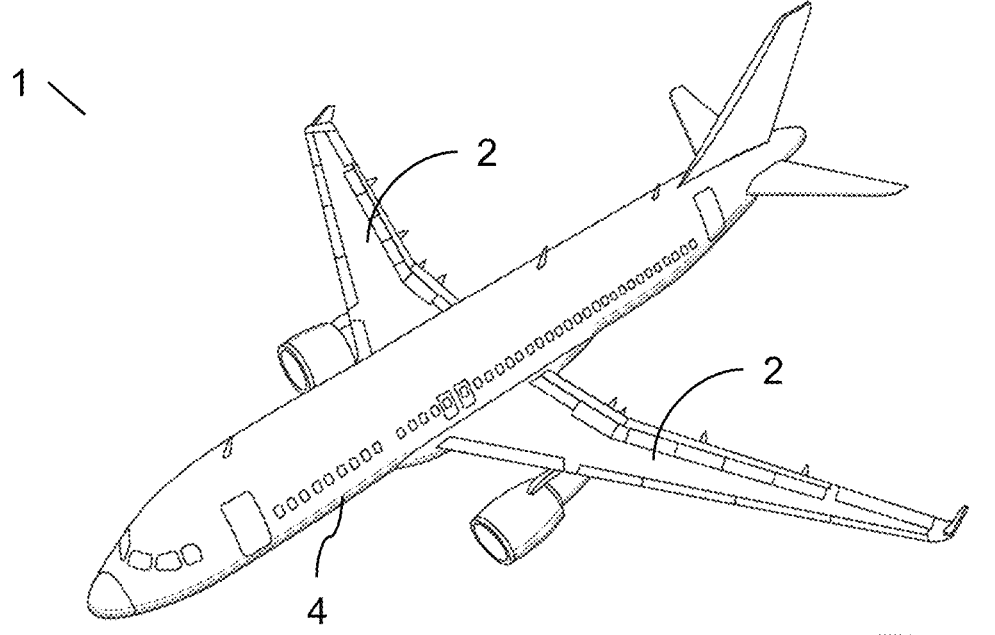
FIG. 1 shows a schematic perspective view of an aircraft.
Figure 2:
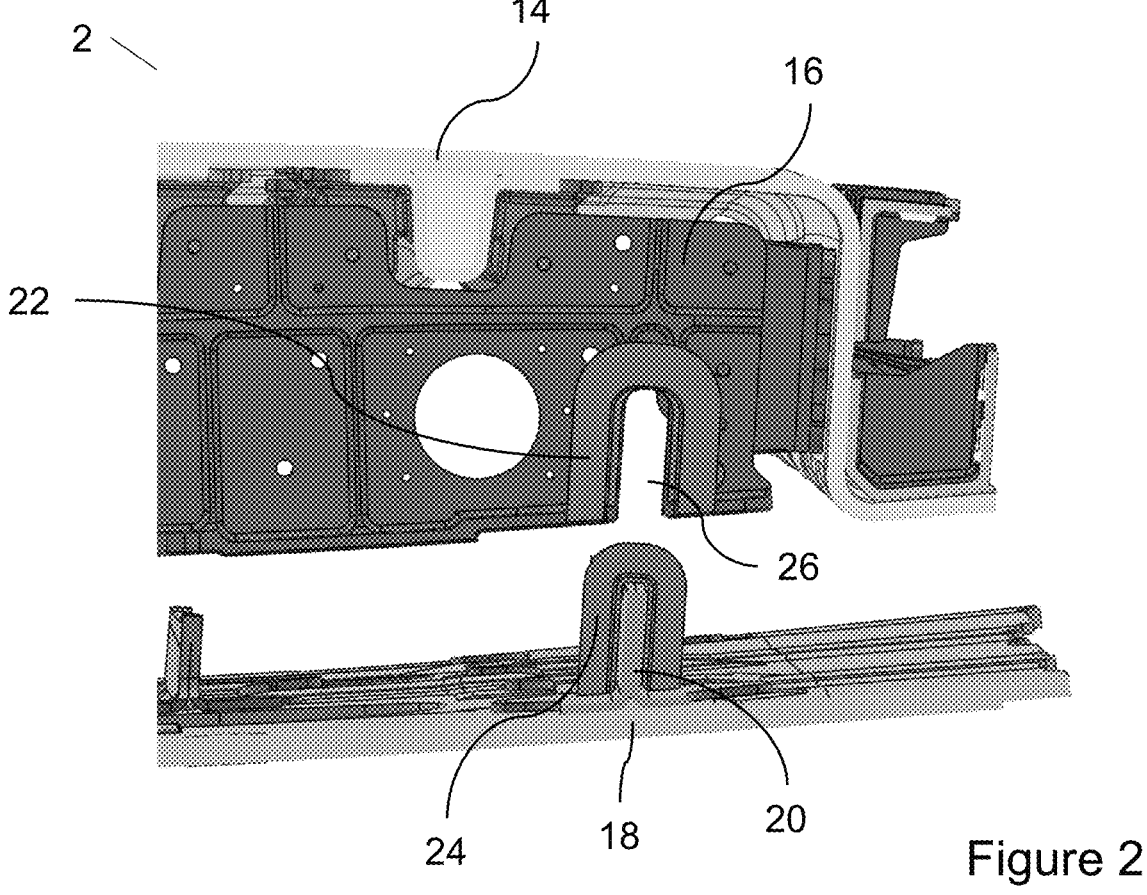
FIG. 2 shows a schematic cross-sectional perspective view of a part of an aircraft wing assembly prior to the wing assembly being fully assembled.
Figure 12A:
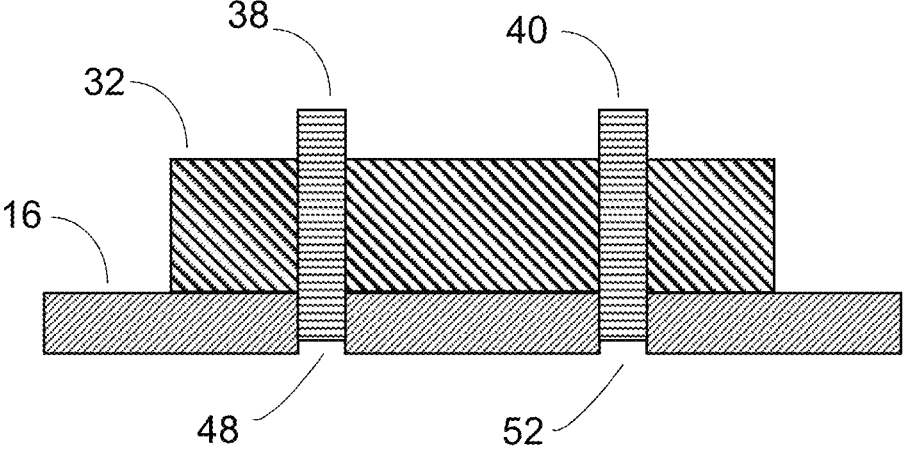
FIG. 12*a* is a schematic cross sectional side view of a position referencing part of the tool of FIG. 3 on a first component of an aircraft wing assembly.
Figure 12B:
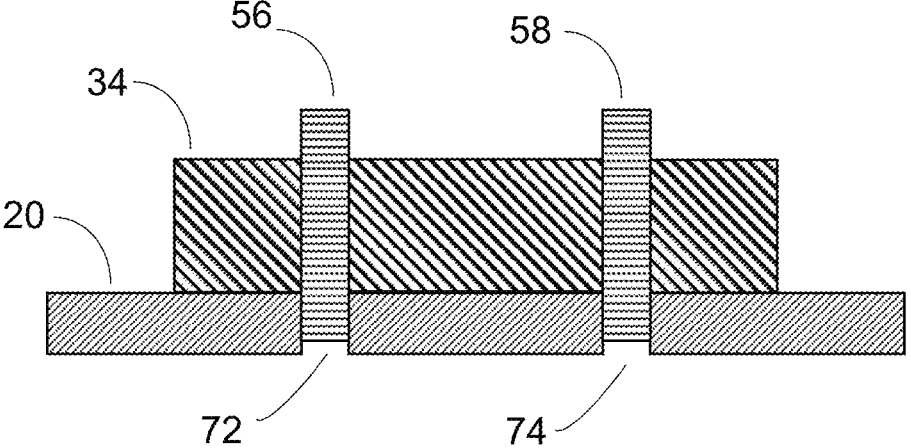
FIG. 12*b* is a schematic cross sectional side view of a position setting part of the tool of FIG. 3 on a second component of an aircraft wing assembly.

FIG. 1 shows an aircraft 1 comprising a pair of aircraft wing assemblies 2 connected to a fuselage 4. Each aircraft wing assembly 2 comprises plural components that are secured together. FIG. 2 shows a schematic cross-sectional view of a part of one of the aircraft wing assemblies 2 which comprises an upper cover 14 and a lower cover 18 before the upper cover 14 and the lower cover 18 are brought together. In this example, a first component 16 of the aircraft wing assembly 2 is a rib 16 which is attached to the upper cover 14 while a second component 20 of the aircraft wing assembly 2 is a stringer 20 which is attached to the lower cover 18. The rib 16 comprises a first hole 48 and a second hole 52 (both of which are best illustrated in FIG. 12*a* below) while the stringer 20 comprises a first hole 72 and a second hole 74 (both of which are best illustrated in FIG. 12*b* below). Although not illustrated in the Figures, when the rib 16 is attached to the stringer 20, the first hole 48 in the rib 16 is axially aligned with the first hole 72 in the stringer 20 and a first bolt (not shown) extends through both holes 48, 72, and similarly, the second hole 52 in the rib 16 is axially aligned with the second hole 74 in the stringer 20 and a second bolt (not shown) extends through both holes 52 and 74. Accordingly, the positional relationship between the first and second holes 48, 52 relative to each other in the rib 16 (i.e. the distance between the holes and the orientation of one relative to the other) matches the positional relationship between the first and second holes 72, 74 relative to each other in the stringer 20. To ensure a substantially fluid-tight seal (to inhibit flow of a fluid, such as fuel) between the rib 16 and the stringer 20 a seal 22, 24 is provided between the rib 16 and the stringer 20. A first part of the seal 22, 24 comprises an outer housing 22 that is attached to the rib 16. A second part of the seal comprises a sealing member, in this case a seal blade 24, that is positioned on the stringer 20 such that, when the rib 16 is attached to the stringer 20, the seal blade 24 engages with the outer housing 22 to create a substantially fluid tight seal between the rib 16 and the stringer 20.

The outer housing 22 defines a substantially "U-shaped" opening 26 in the rib 16 (sometimes referred to as a mouse hole). When the rib 16 is secured to the stringer 20, the opening 26 receives the stringer 20 along with the seal blade 24 that is attached to the stringer 20. This helps to create the substantially fluid tight seal between the rib 16 and the stringer 20.

While a seal between the rib 16 and the stringer 20 may, in some situations, be applied after the rib 16 and the stringer 20 have been connected, this may be time consuming and difficult due to spatial constraints within the aircraft wing assembly 2. Therefore, the two parts of the seal 22, 24 are applied to the rib 16 and the stringer 20 respectively before the rib 16 and the stringer 20 are connected together. To ensure that the seal blade 24 is in the correct position on the stringer 20, such that it will be aligned with the outer housing 22 when the rib 16 is connected to the stringer 20, a tool 30 is used to set the seal blade 24 in a correct position on the stringer 20. The tool 30 utilises the matching positional relationships between the first and second holes 48, 52 in the rib 16 and the first and second holes 72, 74 in the stringer 20 to ensure the seal blade 24 is set in the correct position.

Figure 3:
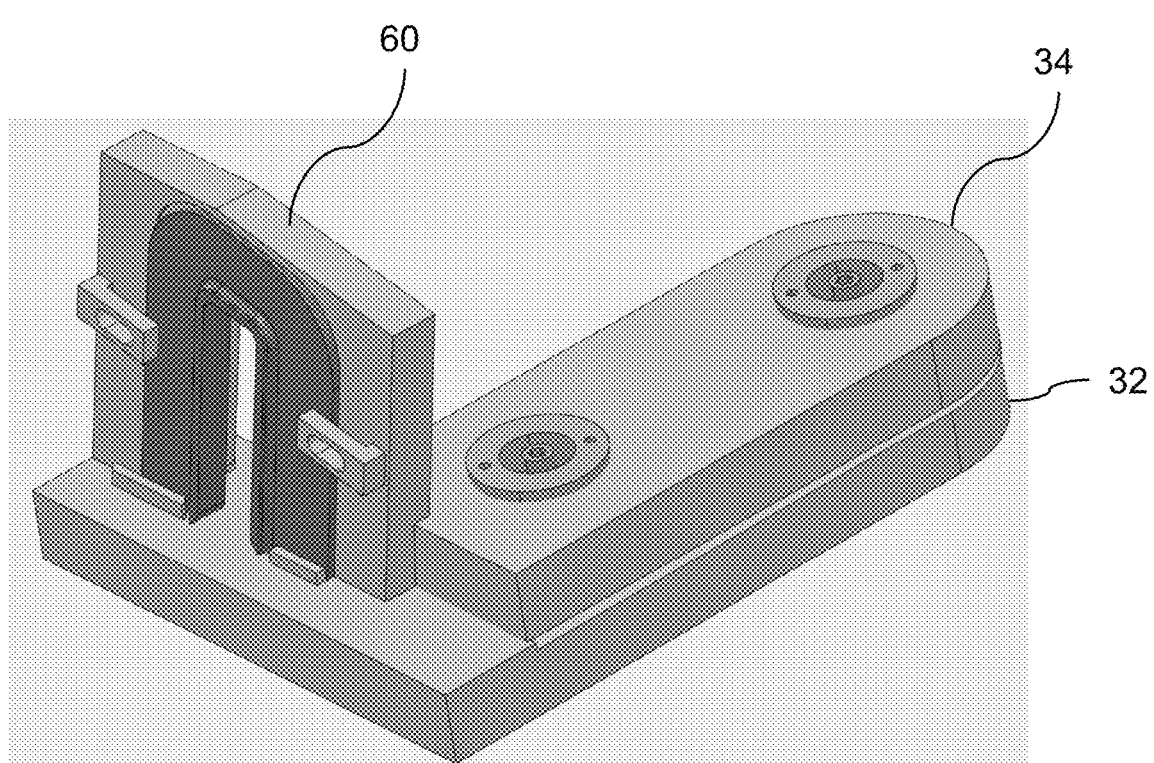
FIG. 3 shows a schematic perspective view of a tool for positioning a sealing member in the aircraft wing assembly.

The tool 30 is shown in FIG. 3 and comprises a position referencing part 32 and a position setting part 34. In FIG. 3, the tool 30 is shown with the position setting part 34 arranged on top of the position referencing part 32. Both the position referencing part 32 and the position setting part 34 have a substantially "L-shaped" cross-sectional shape in plan view, such that the tool 30 as a whole has a substantially "L-shaped" cross-sectional shape in plan view. In this example, the position referencing part 32 is removable from the position setting part 34 (in other words they are not permanently connected) to allow the position referencing part 32 to engage with the rib 16 of the aircraft wing assembly 2 and to allow the position setting part 34 to engage with the stringer 20 of the aircraft wing assembly 2.

Figure 4:
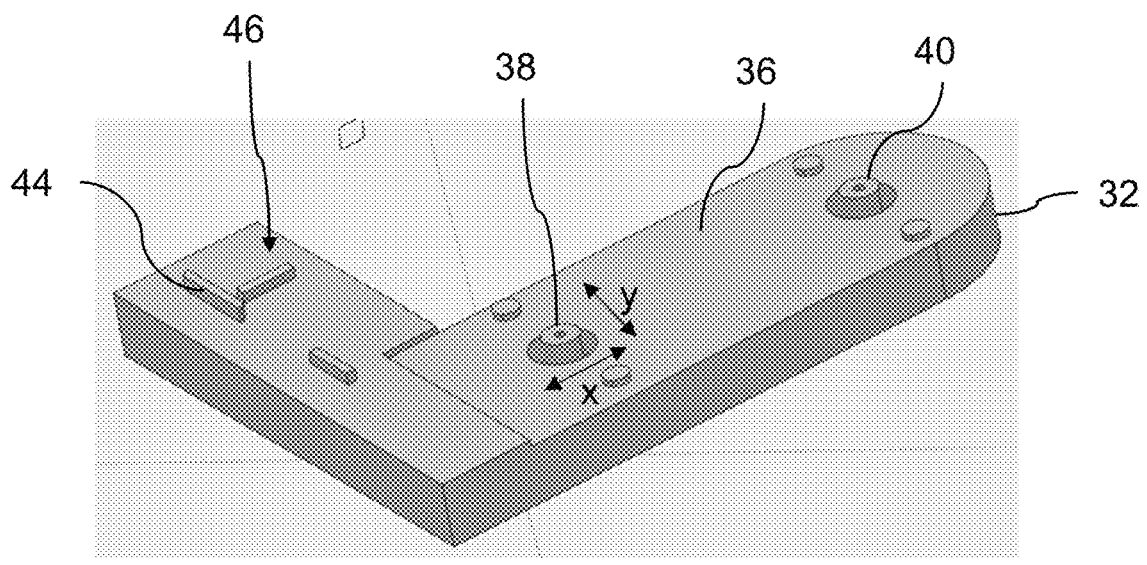
FIG. 4 shows a schematic perspective view of a part of the tool illustrated in FIG. 3.

The position referencing part 32 in shown in isolation of the position setting part 34 in FIG. 4 and comprises a first body 36, a first position referencing pin 38, a second position referencing pin 40 and one or more position referencing features in the form of three elongate protrusions 44 that are located on a surface 46 of the first body 36. The first and second position referencing pins 38, 40 extend through the first body 36 and are moveable relative to the first body 36. Each of the first and second referencing pins 38, 40 has three degrees of freedom such that they can rotate about their longitudinal axis and also move laterally in the x and y directions (which directions are substantially (i.e., +/−10%) perpendicular to each other) as shown in FIG. 4. The first and second position referencing pins 38, 40 can move up to approximately 4 mm in both the x and y directions.

Figure 5:
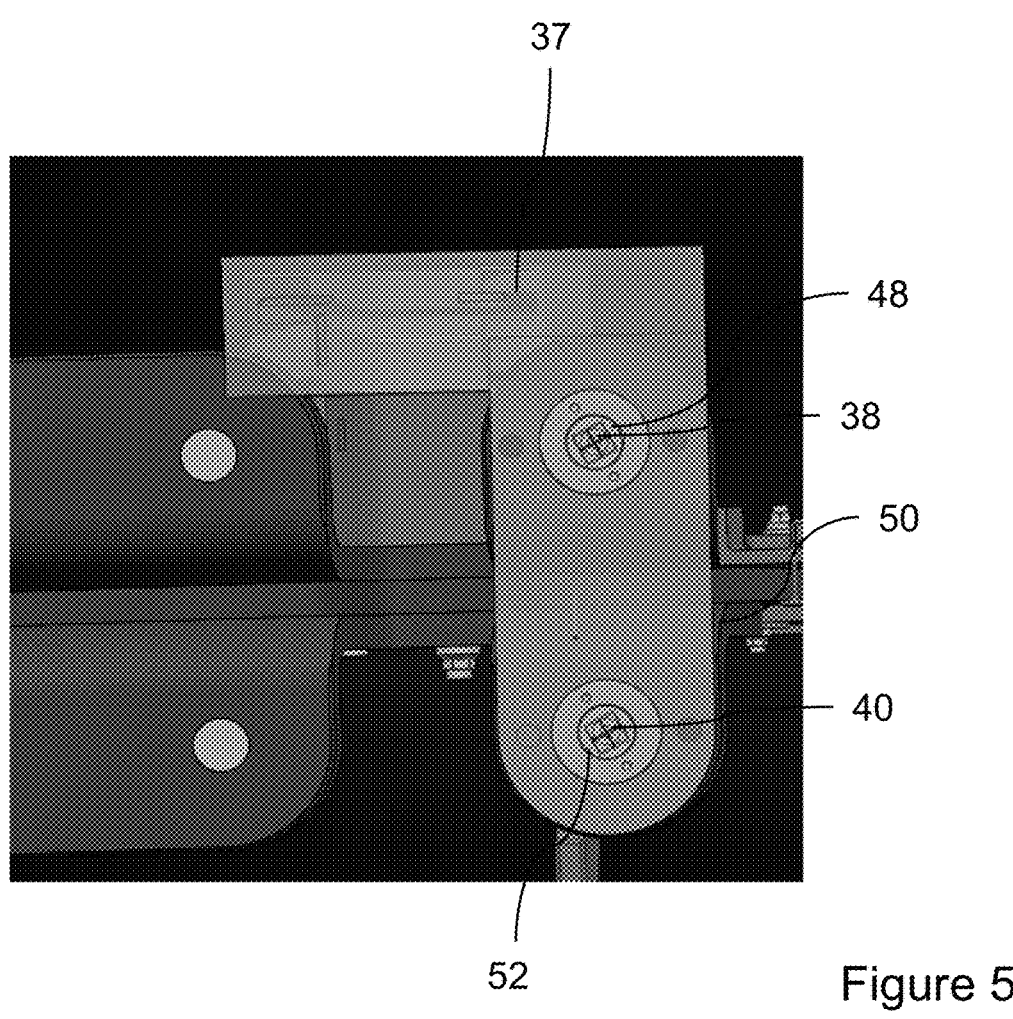
FIG. 5 shows a schematic plan view from below of a part of the tool of FIG. 3 in use.

When the position referencing part 32 is arranged on or is placed against the rib 16 of the aircraft wing assembly 2, as shown in FIG. 5, the first position referencing pin 38 is received by the first hole 48 in the foot 50 of the rib 16 and the second position referencing pin 40 is received by the second hole 52 in the foot 50 of the rib 16. As both the first position referencing pin 38 and the second position referencing pin 40 are moveable relative to the first body 36, the position of the position referencing pin 38 and/or the second position referencing pin 38 may be changed relative to the first body 36 to account for manufacturing tolerances in the positioning of (and hence distance between) the first hole 48 and the second hole 52. This movement enables the first referencing pin 38 and the second position referencing pin 40 to be received respectively in the first hole 48 and the second hole 52.

When the position referencing part 32 is arranged on or is placed against the rib 16 of the aircraft wing assembly 2 with the first position referencing pin 38 received by the first hole 48 and the second position referencing pin 40 received by the second hole 52, the first body 36 may be rotated and/or moved laterally relative to the first position referencing pin 38 and the second position referencing pin 40 so that the elongate protrusions 44 on the first body 36 are correctly aligned with corresponding alignment features 37 on the outer housing 22 on the rib 16 as best shown in FIG. 5. Accordingly, when the position referencing part 32 is arranged as shown in FIG. 5, the first position referencing pin 38 and the second position referencing pin 40 are in a first reference positional relationship relative to each other (i.e. there is a particular distance between the pins and a particular orientation of one relative to the other) and the elongate protrusions 44 on the first body 36 are in a second reference positional relationship with respect to the first position referencing pin 38 and the second position referencing pin 40. The first position referencing pin 38 and the second position referencing pin 40 are locked by any suitable locking means (not shown) in the first body 36 in the first reference position relationship and the position referencing part 32 is removed from the rib 16.

The position setting part 34 of the tool 30 comprises a second body 54, a first bush 57, a second bush 59 and a position setting member 60 which, as will be explained in more detail below, is for setting a position of the seal blade 24 when the second body 54 is positioned on the stringer 20. In this example, the position setting member 60 is a retainer

60 for holding the seal blade 24. The first and second bushes 57, 59 are moveable relative to the second body 54 and have three degrees of freedom so that they can rotate about their longitudinal axis and move in the same x and y directions as shown in FIG. 4 in relation to the first 38 and second 40 position referencing pins of the position referencing part 32. As with the first 38 and second 40 position referencing pins, the bushes 57, 59 can also move up to approximately 4 mm in both the x and y directions.

The retainer 60 comprises a plate 62, two arms 64 attached to the plate 62 and a recess 66 formed in the plate 62. The plate 62 is perpendicular to the second body 54. The recess 66 and the arms 64 act to restrict movement of the seal blade 24 when the seal blade 24 is held by the retainer 60. In use, the seal blade 24 slides into the recess 66 from an underside of the position setting part 34.

After the position referencing part 32 is removed from the rib 16, the position setting part 34 is placed on the position referencing part 32 (as shown in FIG. 3) with the first position referencing pin 38 of the position referencing part 32 received by the first bush 57 of the position setting part 34 and the second position referencing pin 40 of the position referencing part 32 received by the second bush 59 of the position setting part 34. The bushes 57, 59 are moveable in the x and y directions relative to the second body which enables the bushes 57, 59 to be aligned to the first positioning referencing pin 38 and the second position referencing pin 40. When the bushes 57, 59 are aligned to the first position referencing pin 38 and the second position referencing pin 40, the elongate protrusions 44 on the surface 46 of the first body 36 align with corresponding alignment features of the seal blade 24, and the retainer 60 of the position setting part 34 is now located, in a position relative to the bushes 57, 59, that is correct for setting the position of the seal blade 24, when, as will be explained below, the position setting part 34 engages the stringer 20.

The first bush 57 and the second bush 59 are locked by any suitable locking means (not shown) in the positions shown in FIG. 3 and hence are fixed in a positional relationship that is the same as the first reference positional relationship of the first position referencing pin 38 and the second position referencing pin 40 described above.

The position setting part 34 is then removed from the position referencing part 32 and a first position setting pin 56 is inserted into the first bush 57 and a second position setting pin 58 is inserted into the second bush 59.

Figure 6:
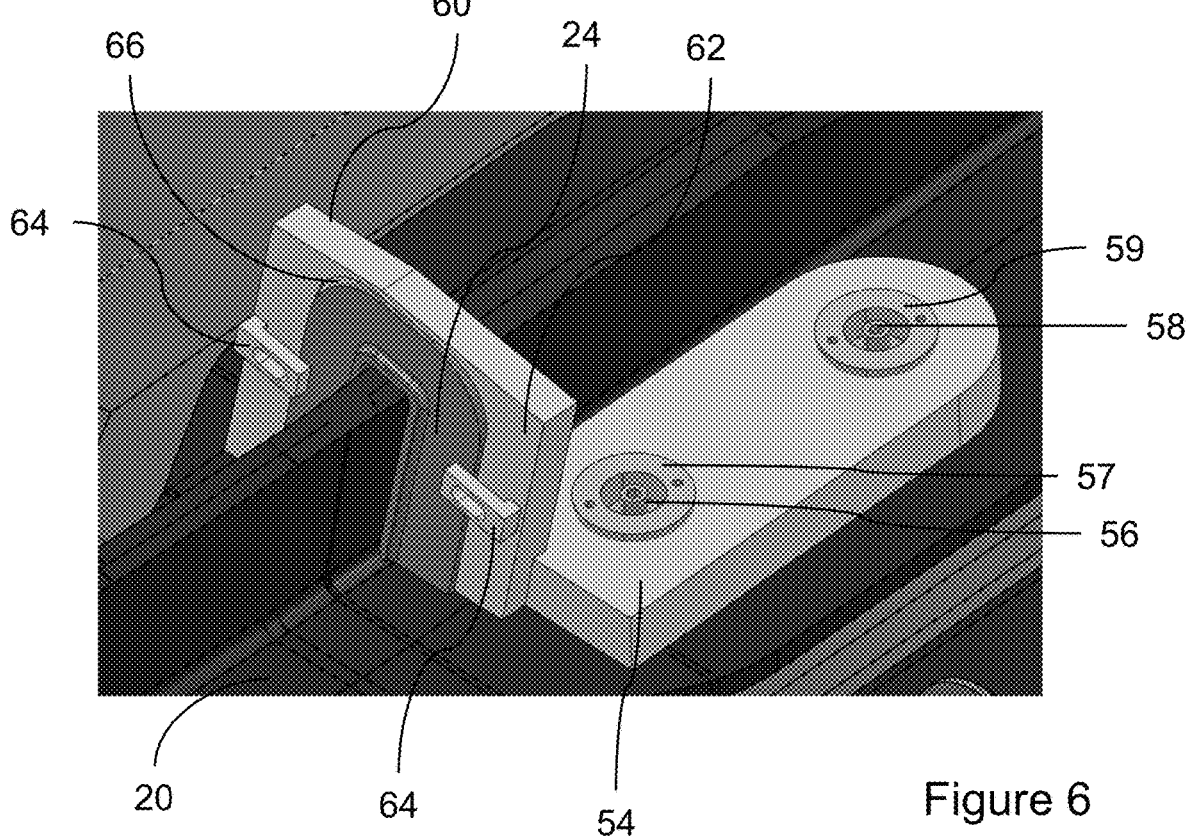
FIG. 6 shows a schematic perspective view from above of a part of the tool of FIG. 3 in use.

The position setting part 34 is then arranged on or is placed on the stringer 20, as shown in FIG. 6, with the first position setting pin 56 received in the first hole 72 in the stringer 20 and the second position setting pin 58 received in the second hole 74 in the stringer 20. The retainer 60 is located over the stringer 20 with the seal blade 24 positioned over the stringer 20. When the position setting part 34 is set on the stringer 20, as shown in FIG. 6, the first and second position setting pins 56, 58 have the same first reference positional relationship with respect to each other as did the first and second position referencing pins 38 and 40 when the position reference part 34 was placed on the first component 16 as shown in FIG. 5. Furthermore, because the retainer 60 was aligned with the elongate protrusions 44 of the position referencing part 32 as shown in FIG. 3, the retainer 60 has the same second reference positional relationship with the first and second position referencing pins 38 and 40 as did the elongate protrusions 44 with the first positioning referencing pin 38 and the second position referencing pin 40. As such the retainer 60 sets the seal blade 24 in a position such that when the rib 16 is connected to the stringer 20, the seal blade 24 will be correctly received by the outer housing 22.

Figure 7:
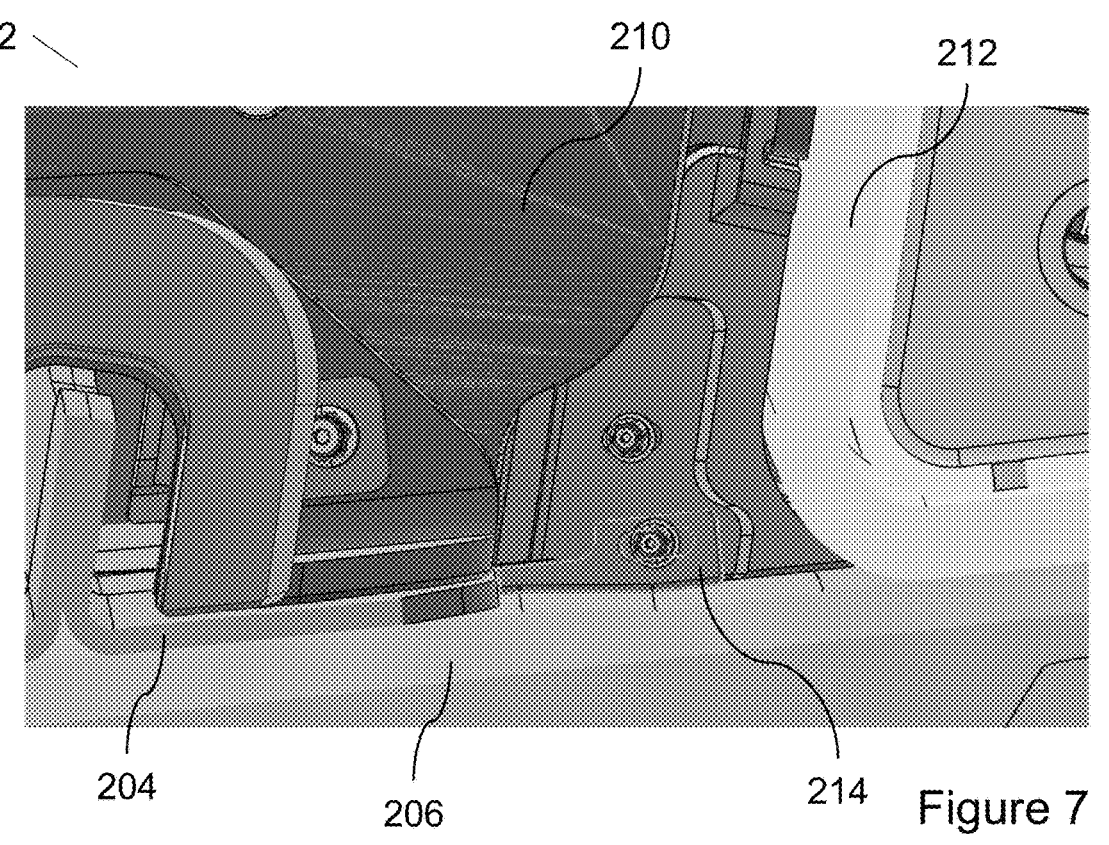
FIG. 7 shows a schematic cross-sectional view of another part of the aircraft wing assembly.

FIG. 7 shows a schematic cross-sectional view of another part of the aircraft wing assembly 2. In this example, a first component of the aircraft wing assembly 2 is a stringer 204 arranged on a lower cover 206 and a second component of the aircraft wing assembly is a rib 210 attached to an upper cover (not shown in FIG. 7). A spar 212 is also attached to the upper cover (not shown in FIG. 7). To create a substantially fluid-tight seal between the stringer 204 and the spar 212, a seal plate 214 is provided between the spar 212 and the stringer 204.

Figure 8:
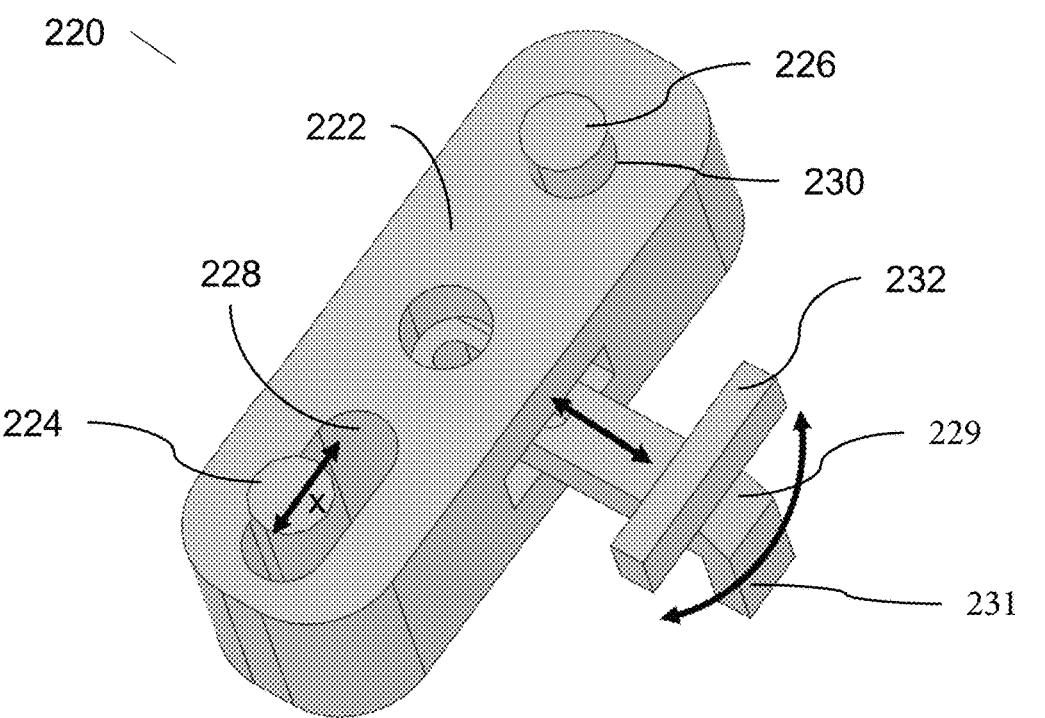
FIG. 8 shows a schematic perspective view from above of a further tool for positioning a different sealing member in the aircraft wing assembly.

FIG. 8 shows an alternative tool 220 for positioning a sealing member, in this case the seal plate 214, in the aircraft wing assembly 2 shown in FIG. 8. The tool 220 of FIG. 8 comprises a first body 222, a first pin 224 and a second pin 226. In this example, the tool 220 is a 'one piece' tool that acts both as a position referencing part 221 (in a similar way to the position referencing part 32 described above) and as a position setting part 221 (in a similar way to the position setting part 34 described above). As such, the first body 222 (hereinafter referred to as the "body 222") performs a similar function as the first body 36 and the second body 54 described above and the first pin 224 and the second pin 226 each function as a position referencing pin and a position setting pin.

The tool 220 also comprises a position referencing member in the form of a leg 229 (which may also be referred to as a position setting member in this example) that extends laterally from, and is moveable relative to, the body 222. The body 222 has a substantially oval cross-sectional shape when view in plan.

In this example, the first pin 224 and the second pin 226 are both substantially cylindrical with a substantially circular cross-sectional shape. Both pins 224, 226 extend through respective first and second openings 228, 230 in the body 222 such that a part of each of the pins 224, 226 protrudes from the body 222. As shown in FIG. 8, the first opening 228 is elongate so as to allow the first pin 224 to move in a first direction relative to the body 222 (as shown by arrow X) generally parallel to the longitudinal axis of the body 222, while the second opening 230 is not elongate such that the second pin 226 is fixed in position relative to the body 222.

The leg 229 extends from the body 222 in a direction substantially perpendicular to the longitudinal axes of the first pin 224 and the second pin 226 and the longitudinal axis of the body 222. An end of the leg 229 distal from the body 222 comprises a first part 231 that extends in a direction that is towards the lower cover 206, when the tool 220 is located on the first component 200, and a second part 232 that extends in direction parallel to the longitudinal axis of the body 222. The extent to which the leg 229 extends from the body 222 is adjustable. As shown by the arrows in FIG. 8, the leg 229 is movable towards and away from the body 222, and also pivots about the body 222 (as shown by the arrows in FIG. 9). The leg 229 can pivot relative to the body 222 in a plane substantially perpendicular to the longitudinal axes of the first 224 and second 226 pins.

Figure 9:
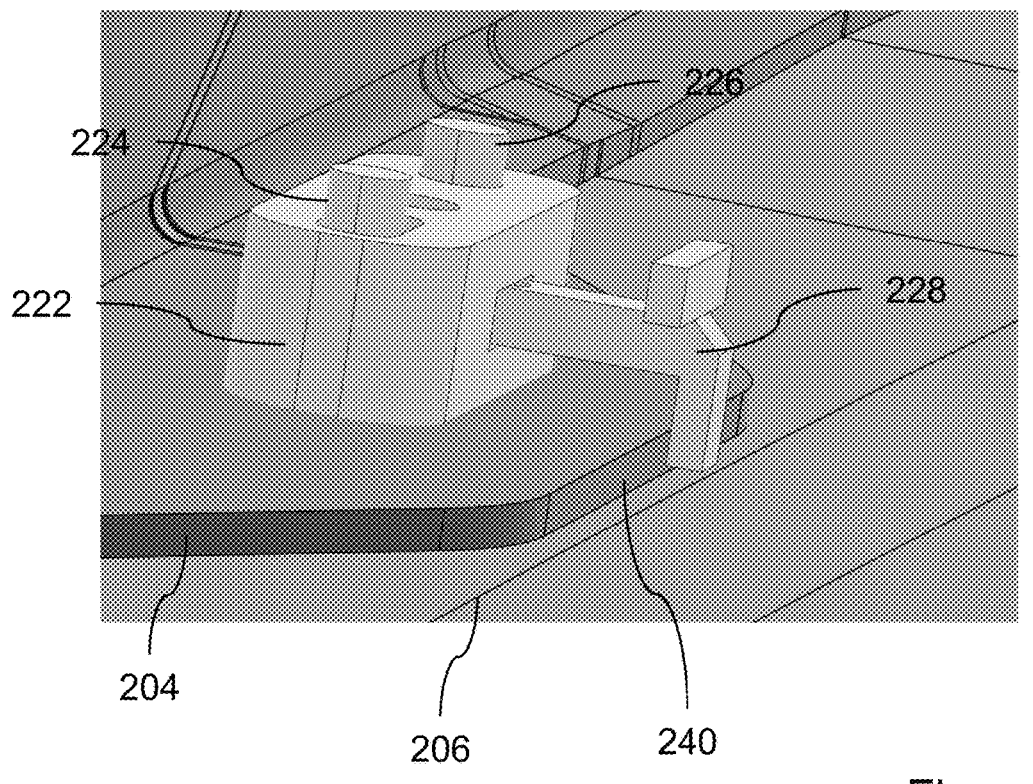
FIG. 9 shows a schematic perspective view of the tool of FIG. 8 in use.

When the tool 220 is placed on the stringer 204 of the aircraft wing assembly, as shown in FIG. 9, the first pin 224 is received in a first hole of the stringer 204 and the second pin 226 is received in a second hole of the stringer 204 so that the first pin 224 and the second pin 226 are in a first reference positional relationship with respect to each other. As the first pin 224 is moveable relative to the body 222, the position of the first pin 224 may change to account for manufacturing tolerances in the positioning of the first and second holes in the stringer 204.

The leg 229 is movable such that the first part 231 of the leg 229 engages with an edge 240 of the stringer 204. When the first part 231 of the leg 229 is engaged with the stringer 204 as shown in FIG. 9, the first part 231 of the leg 229 is in a second positional relationship with respect to the first pin 224 and the second pin 226. The leg 229 is locked in place relative to the body 222 to ensure that the leg 229 remains in the same position relative to the body 222 and the tool 220 is removed from the stringer 204. In other examples, the leg 229 may not be fixed in position relative to the body 222, but may nonetheless return to the same position relative to the body 222 when, as will be described below, the tool 220 is engaged with the rib 210 of the aircraft wing assembly 2.

Figure 10:
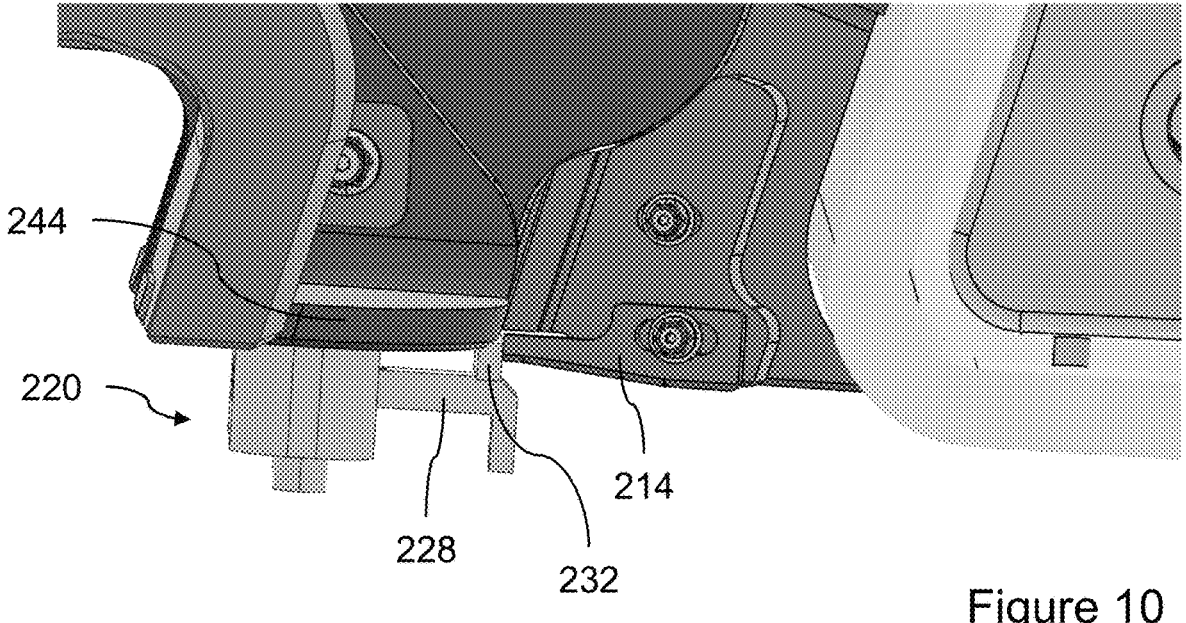
FIG. 10 shows another schematic perspective view of the tool of FIG. 8 in use.

When the tool 220 is placed on the rib 210 of the aircraft wing assembly 2 as shown in FIG. 10, the first pin 224 is received by a first hole in the foot 244 of the rib 210 and the second pin 226 is received in a second hole in the foot 244 of the rib 210. As the first and second holes in the foot 244 of the rib 210 have the same positional relationship as the first and second holes in the stringer 204, the first pin 224 and the second pin 226 again have first reference positional relationship with respect to each other and the first part 231 of the leg 229 has the second positional relationship with respect to the first pin 224 and the second pin 226 and sets the location of the seal plate 214 in the aircraft wing assembly 2. The seal plate 214 is positioned to abut against the second part 232 of the leg 229 which means that, when the stringer 204 is connected to the rib 210, the seal plate 214 will abut against the edge 240 of the stringer 204.

Figure 11:
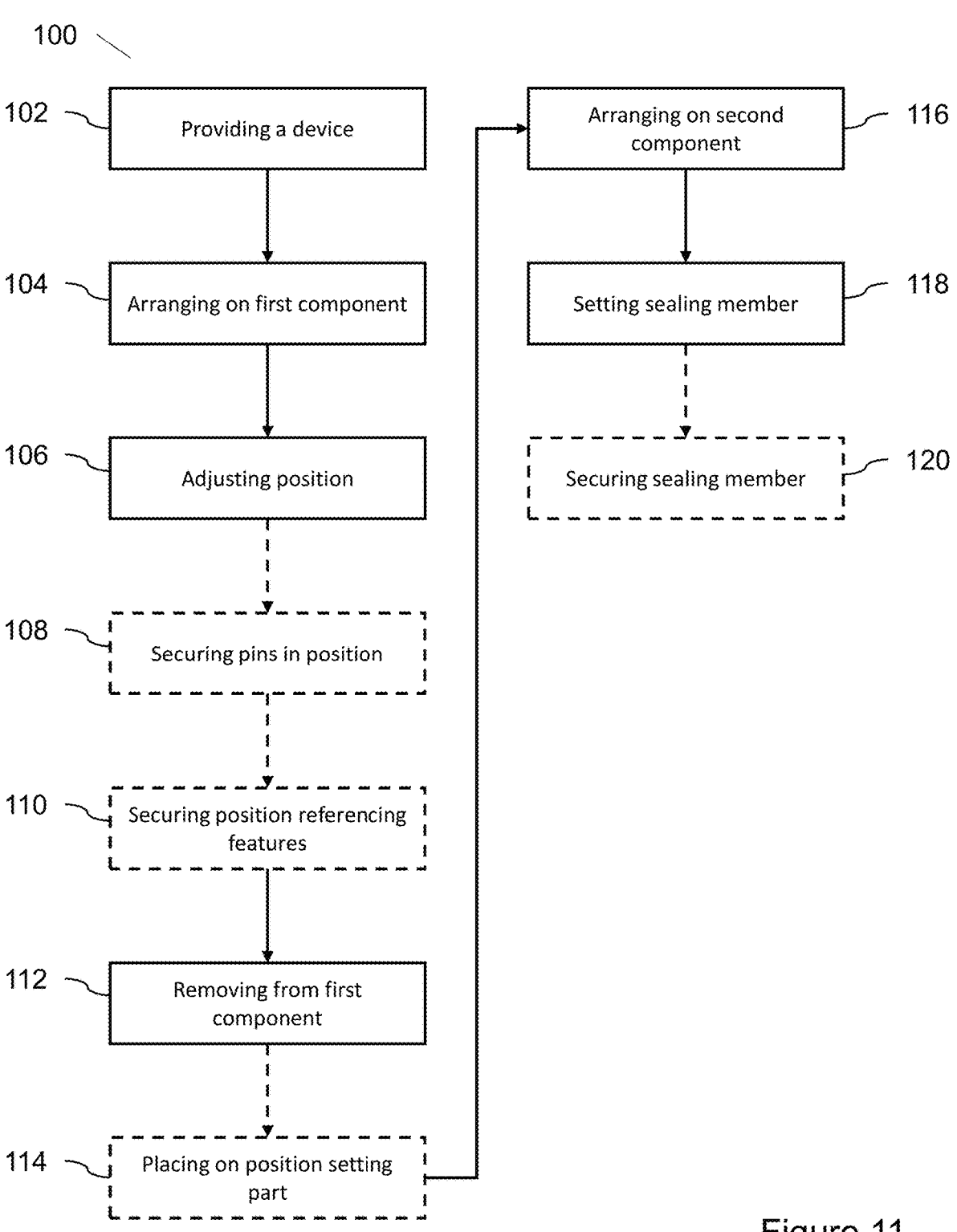
FIG. 11 shows a flow diagram of a method of positioning a sealing member in an aircraft wing assembly.

FIG. 11 shows a flow chart of a method 100 of positioning a seal member (which may be the seal blade 24 or the seal plate 214) in the aircraft wing assembly 2. The method 100 comprises providing 102 the tool 30, 220 as discussed herein and arranging 104 the position referencing part 32, 221 on the first component 16, 204 of the aircraft wing assembly 2 such that the first position referencing pin 38, 224 is received by the first hole 48, in the first component 16, 204 and the second position referencing pin 40, 226 is received in the second hole 52, in the first component 16, 204 with the first position referencing pin 38, 224 and the second position referencing pin 40, 226 having the first positional relationship with respect to each other.

The method 100 then comprises positioning 106 the one or more position referencing features (such as the elongate protrusions 44 or the leg 229) of the position referencing part 32, 221 with respect to one or more corresponding referencing features of the further component of the aircraft wing so that the one or more position referencing features of the position referencing part 32, 221 have the second reference positional relationship with respect to the first position referencing pin 38, 224 and the second position referencing pin 40, 226, and securing 108 the first position referencing pin 38, 224 and the second position referencing pin 40, 226 in position relative to the first body 36, 222.

In some examples, such as when using the tool 230 as described in relation to FIGS. 8 to 10, the method 100 comprises securing 110 the one or more position referencing features (the leg 229) relative to the first body 222. The method 100 then comprises removing 112 the position referencing part 32, 221 from the first component 16, 204. In some examples, such as when using the tool 30 as described in relations to FIGS. 2 to 6, the method 100 then comprises placing 114 the position setting part 34 on the position referencing part 32 such that the first bush 57 of the second body 54 of the position setting part 34 receives the first position referencing pin 38 and the second bush 59 of the second body 54 receives the second position referencing pin 40 and the position setting member of the position setting part 34 has a positional relationship relative to the first position setting pin 56 and the second position setting pin 58 that corresponds with the second reference positional relationship. The method 100 then comprises arranging 116 the position setting part 34, 221 on the second component 20, 210 such that the first position setting pin 56, 224 is received by the first hole 72 in the second component 20, 210 and the second position setting pin 58, 226 is received by the second hole 74 in the second component 20, 210 with the first position setting pins 56, 224 and second position setting pins 58, 226 having a positional relationship with respect to each other that matches the first reference positional relationship.

The method 100 then comprises using 118 the position setting member (either the leg 229 or the retainer 60), that has a positional relationship relative to the first position setting pin 56, 224 and the second position setting pin 58, 226 that corresponds with the second reference positional relationship, to set the position of the sealing member and securing 120 the sealing member to the second component 20, 210, for example by applying an adhesive between the sealing member and the second component 20, 210. Once the securing member has been secured in place, the tool 30, 230 can be removed from the second component 20, 210.

In some examples, any one or more of the steps of securing 108 the first position referencing pin 38, 224 and the second position referencing pins 40, 226 in position, placing 114 the position referencing part 32, 221 on the position setting part 34, 221, securing 110 the one or more position referencing features, and securing 120 the sealing member to the second component 20, 210 may be omitted.

FIG. 12a is a schematic cross sectional side view of the position referencing part 32 on the first component 16.

FIG. 12b is a schematic cross sectional side view of the position setting part 34 on the first component 16.

It is to be noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool for positioning a sealing member in an aircraft wing assembly by using first and second holes in a first component of the aircraft wing assembly and first and second holes in a second component of the aircraft wing assembly as positioning reference points, wherein a positional relationship of the first hole and the second hole with respect to each other in the first component matches a positional relationship of the first hole and the second hole with respect to each other in the second component, the tool comprising:

a position referencing part comprising:

a first body for receiving a first position referencing pin and a second position referencing pin; and one or more position referencing features, wherein at least one of the first and second position referencing pins when received in the first body is moveable relative to the first body so that the first body is configured to be arranged on the first component of the aircraft wing assembly with the first position referencing pin received in the first hole of the first component and with the second position referencing pin received in the second hole of the first component with the first position referencing pin and the second position referencing pin having a first reference positional relationship with respect to each other and the one or more position referencing features of the position referencing part positioned with respect to one or more corresponding referencing features of a further component of the aircraft wing so that the one or more position referencing features of the position referencing part have a second reference positional relationship with respect to the first position referencing pin and the second position referencing pin;

a position setting part comprising:

a second body for receiving a first position setting pin and a second position setting pin; wherein the second body is configured to be arranged on the second component of the aircraft wing assembly with the first position setting pin received in the first hole of the second component and the second position setting pin received in the second hole of the second component with the first and second position setting pins having a positional relationship with respect to each other that matches the first reference positional relationship, wherein the position setting part further comprises a position setting member for setting a position of the sealing member when the second body is so arranged on the second component of the aircraft wing assembly, wherein the position setting member is configured to be arranged so that the position setting member has a positional relationship relative to the first position setting pin and the second position setting pin that corresponds with the second reference positional relationship, whereby the position setting member is positioned to set the position of the sealing member, wherein the one or more position referencing features of the position referencing part comprise at least one protrusion extending from a surface of the first body.

2. The tool according to claim 1, wherein both the first position referencing pin and the second position referencing pin are configured to move relative to the first body.

3. The tool according to claim 1, wherein the further component of the aircraft wing assembly comprises an outer housing that is configured to receive the sealing member and the one or more corresponding referencing features comprise one or more parts of the outer housing.

4. The tool according to claim 1, wherein one of the first position referencing pin and the second position referencing pin is fixed in position relative to the first body.

5. The tool according to claim 1, wherein both the first position referencing pin and the second position referencing pin are configured to move relative to the first body.

6. The tool according to claim 1, wherein a distance between the first position referencing pin and the second position referencing pin is between approximately 50 mm and 100 mm.

7. The tool according to claim 1, wherein a distance between the first position setting pin and the second position setting pin is between approximately 50 mm and 100 mm.

8. A tool for positioning a sealing member in an aircraft wing assembly by using first and second holes in a first component of the aircraft wing assembly and first and second holes in a second component of the aircraft wing assembly as positioning reference points, wherein a positional relationship of the first hole and the second hole with respect to each other in the first component matches a positional relationship of the first hole and the second hole with respect to each other in the second component, the tool comprising:

a position referencing part comprising:
    a first body for receiving a first position referencing pin and a second position referencing pin; and one or more position referencing features, wherein at least one of the first and second position referencing pins when received in the first body is moveable relative to the first body so that the first body is configured to be arranged on the first component of the aircraft wing assembly with the first position referencing pin received in the first hole of the first component and with the second position referencing pin received in the second hole of the first component with the first position referencing pin and the second position referencing pin having a first reference positional relationship with respect to each other and the one or more position referencing features of the position referencing part positioned with respect to one or more corresponding referencing features of a further component of the aircraft wing so that the one or more position referencing features of the position referencing part have a second reference positional relationship with respect to the first position referencing pin and the second position referencing pin;

a position setting part comprising:
    a second body for receiving a first position setting pin and a second position setting pin; wherein the second body is configured to be arranged on the second component of the aircraft wing assembly with the first position setting pin received in the first hole of the second component and the second position setting pin received in the second hole of the second component with the first and second position setting pins having a positional relationship with respect to each other that matches the first reference positional relationship, wherein the position setting part further comprises a position setting member for setting a position of the sealing member when the second body is so arranged on the second component of the aircraft wing assembly, wherein the position setting member is configured to be arranged so that the position setting member has a positional relationship relative to the first position setting pin and the second position setting pin that corresponds with the second reference positional relationship, whereby the position setting member is positioned to set the position of the sealing member, wherein the second body comprises a first bush and a second bush, wherein the second body is configured to be placed on the first body and at least one of the first bush and the second bush is moveable relative to the second body such when second body is placed on the first body when the first position referencing pin and the second position referencing pin are fixed in the first reference positional relationship, the first position referencing pin is received in the first bush and the second position referencing pin is received in the second bush with the first and second bushes having a positional relationship that matches the first positional relationship, wherein the first bush and second bush are configured to be locked in a positional relationship that matches the first positional relationship.

9. The tool according to claim 8, wherein the second body is configured to be removed from the first body with the first bush and second bush locked in the positional relationship that matches the first positional relationship and wherein the first position setting pin is configured to be inserted in the first bush and the second position setting pin is configured to be inserted in the second bush with the first bush and second bush locked in the positional relationship that matches the first positional relationship.

10. The tool according to claim 9, wherein the position setting member is a retainer configured to hold the sealing member and wherein, when the second body is positioned on the second component of the aircraft wing assembly with the first position setting pin received in the first hole of the second component and the second position setting pin received in the second hole of the second component, the retainer has a positional relationship relative to the first position setting pin and the position setting pin that corresponds with the second reference positional relationship, whereby the retainer is positioned to set the position of the sealing member.

11. The tool according to claim 10, wherein the retainer comprises a plate that is substantially perpendicular to the second body.

12. The tool according to claim 11, wherein the plate comprises a recess configured to receive the sealing member and hold the sealing member in place relative to the second body.

13. A tool for positioning a sealing member in an aircraft wing assembly by using first and second holes in a first component of the aircraft wing assembly and first and second holes in a second component of the aircraft wing assembly as positioning reference points, wherein a positional relationship of the first hole and the second hole with respect to each other in the first component matches a positional relationship of the first hole and the second hole with respect to each other in the second component, the tool comprising:

a position referencing part comprising:
    a first body for receiving a first position referencing pin and a second position referencing pin; and one or more position referencing features, wherein at least one of the first and second position referencing pins when received in the first body is moveable relative to the first body so that the first body is configured to be arranged on the first component of the aircraft wing assembly with the first position referencing pin received in the first hole of the first component and with the second position referencing pin received in the second hole of the first component with the first position referencing pin and the second position referencing pin having a first reference positional relationship with respect to each other and the one or more position referencing features of the position referencing part positioned with respect to one or more corresponding referencing features of a further component of the aircraft wing so that the one or more position referencing features of the position referencing part have a second reference positional relationship with respect to the first position referencing pin and the second position referencing pin;

a position setting part comprising:

a second body for receiving a first position setting pin and a second position setting pin; wherein the second body is configured to be arranged on the second component of the aircraft wing assembly with the first position setting pin received in the first hole of the second component and the second position setting pin received in the second hole of the second component with the first and second position setting pins having a positional relationship with respect to each other that matches the first reference positional relationship, wherein the position setting part further comprises a position setting member for setting a position of the sealing member when the second body is so arranged on the second component of the aircraft wing assembly, wherein the position setting member is configured to be arranged so that the position setting member has a positional relationship relative to the first position setting pin and the second position setting pin that corresponds with the second reference positional relationship, whereby the position setting member is positioned to set the position of the sealing member, wherein the position referencing part and the position setting part are a single position referencing and setting part, the first body and the second body are a single body, the first position referencing pin and the first position setting pin are a single first position referencing and setting pin and the second position referencing and setting pin and the second position referencing pin and the second position setting pin are a single second position referencing and setting pin, the tool further comprising:

a leg extending from, and movable, relative to the single body, wherein the leg is the position setting member and comprises the one or more positioning referencing features, wherein:

when the single body is positioned on the first component of the aircraft wing assembly with the first pin received in the first hole of the first component and with the second pin received in the second hole of the first component so that the first pin and the second pin have the first reference positional relationship with respect to each other, the leg is configured, relative to the single body, to position the one or more position referencing features against one or more corresponding referencing features of the further component of the aircraft wing assembly such that the one or more positioning referencing features are in the second reference positional relationship with respect to the first and second pins; and wherein, when the single body is positioned on the second component of the aircraft wing assembly with the first pin received in the first hole of the second component and the second pin received in the second hole of the second component so that the first pin and the second pin have the first reference positional relationship with respect to each other, the position setting member is configurable so that the one or more positioning referencing features have the second reference positional relationship with respect to the first and second pins, whereby the position setting member is positioned to set the position of the sealing member.

14. The tool according to claim 13, wherein the leg is configured to move relative to the single body when the single body is in a fixed position relative to the first component, or the second component, or both.

15. The tool according to claim 13, wherein the further component of the aircraft wing assembly comprises a stringer.

* * * * *